(No Model.)
G. F. STILLMAN
PNEUMATIC TIRE.
No. 528,213. Patented Oct. 30, 1894.
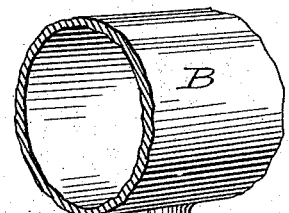
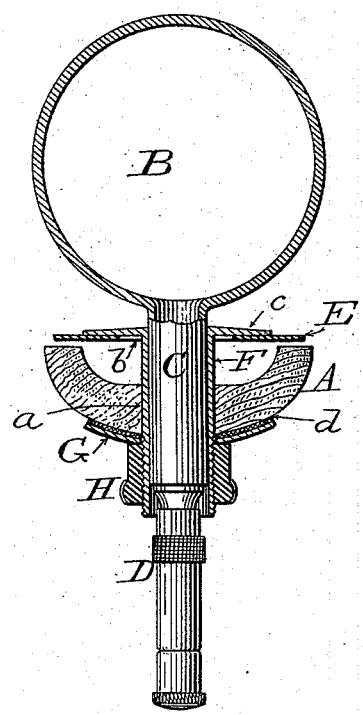
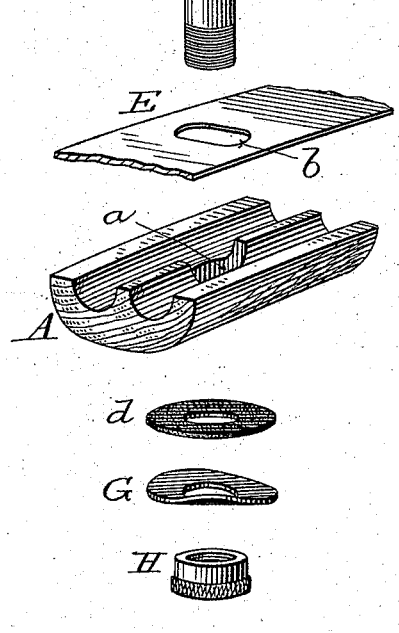
George F. Stillman, Inventor
by Dodge & Sons, Attorneys
Witnesses
C. B. Bull

UNITED STATES PATENT OFFICE.

GEORGE FREDERICK STILLMAN, OF SYRACUSE, NEW YORK.

PNEUMATIC TIRE.

SPECIFICATION forming part of Letters Patent No. 528,213, dated October 30, 1894.

Application filed April 18, 1894. Serial No. 508,000. (No model.)

*To all whom it may concern:*

Be it known that I, GEORGE FREDERICK STILLMAN, a citizen of the United States, residing at Syracuse, in the county of Onondaga and State of New York, have invented certain new and useful Improvements in Pneumatic Tires, of which the following is a specification.

My invention relates to pneumatic tires for vehicles, and has reference more particularly to the means for securing the filling-tube in place in the rim or felly, whereby the entrance of water into the groove of the rim or felly is prevented, and whereby also the filling tube is protected against injury, and the fastening band is prevented from creeping.

In the drawings,—Figure 1 is a transverse sectional view through the rim and tire of a bicycle-wheel, with my improvements applied thereto; and Fig. 2 is a perspective view of the parts separated.

A indicates the rim or felly, which may be made of wood or metal, and B a tire of any desired construction, provided with the usual filling tube C and valve D adapted to be inserted through a hole $a$ in the felly.

Applied to the outer grooved face of the rim or felly A, is a flat band E of metal, which is used for the purpose of holding the outer covering of the tire in place, and which is provided with a hole $b$ in line with the hole $a$ in the felly; the said hole $b$ being elongated laterally, as shown. Through these holes $a$ $b$ is passed a sleeve F threaded externally at its inner end, which projects beyond the inner face of the rim, and flanged as at $c$ at its outer end,—the flange being larger than the hole in the band, and resting upon the outer face of the latter, so as to prevent the sleeve from passing entirely through.

Encircling the sleeve at its inner end is a metal disk or cap G, between which and the felly is placed a washer $d$ of rubber, leather, or other suitable packing material, the cap being advisably curved to conform to transverse curvature of the rim.

H indicates a thumb nut which screws upon the inner end of the sleeve, and by bearing against the cap G draws the sleeve and also the band E, firmly to its seat, and at the same time causes the washer $d$ to press closely against the sides of the sleeve and thereby effect a water-tight joint where the sleeve passes through the rim.

The sleeve F is preferably made of a size to fit snugly around the filling tube, but this is not essential, the pressure of the air within the tire and tube expanding the tube and thereby insuring the complete filling of the sleeve and preventing the water from getting past the tube and into the sleeve. The washer or packing $d$ being held closely to the felly by means of the thumb nut H, prevents the entrance of water around the outside of the sleeve.

From the foregoing it will be seen that not only is water prevented from entering the groove of the rim or felly, but that the filling tube is also supported, practically throughout its entire length, and protected against cutting by the sharp edges of the felly or of the metal band when the latter moves or is moved laterally slightly in applying the outer covering.

In the drawings I have shown simply the inner tube,—the air tube,—of the tire, the outer covering tube being omitted for the sake of clearness. It is to be understood, however, that the present invention is not limited to the use of any special form of rim or felly, or tire; nor to the use of the securing band E.

A very important feature of the present invention is the combination of the band and the sleeve, whereby the band is prevented from creeping circumferentially and cutting off the tube. By making the hole or opening $b$ elongated, laterally, I am enabled to move or push the tire laterally with reference to the band and felly without any danger of cutting off the tube by such movement.

I am aware that broadly considered, a sleeve is not new, but I am not aware that anyone prior to my invention has provided means for preventing the entrance of water around the sleeve; nor, where a metallic band has been employed, has there been any means devised for securing the sleeve in position relatively to the band and the rim or felly. These are matters of the utmost importance especially in connection with wooden rims.

Having thus described my invention, what I claim is—

1. In combination with felly A provided with hole $a$; sleeve F fitted to said hole, and provided at its outer end with a flange $c$ and at its inner end with external screw threads; a tire provided with a filling tube to fit within the sleeve; a packing encircling the sleeve at its inner end; and a nut H screwing upon the sleeve and serving to seat and securely hold the sleeve in place, and also to press the packing against the inner face of the rim with sufficient force to prevent the entrance of water around the sleeve, all substantially as shown and described.

2. In combination with felly A provided with hole $a$; band E provided with a hole $b$ elongated laterally; a sleeve F passing through said holes, and provided at its outer end with flange $c$ and at its inner end with external screw threads; a tire provided with a filling tube to fit within the sleeve; a packing encircling the sleeve at its inner end; and a nut H screwing upon the sleeves and serving to seat and securely hold the sleeve and band in place, and also to press the packing against the inner face of the rim to prevent the entrance of water around the sleeve.

In witness whereof I hereunto set my hand in the presence of two witnesses.

GEORGE FREDERICK STILLMAN.

Witnesses:
M. C. SMITH,
H. BARRY.